United States Patent
Yasuda (10) Patent No.: US 6,744,029 B2
(45) Date of Patent: Jun. 1, 2004

(54) METHOD OF AND APPARATUS FOR CORRECTING IMAGE SHARPNESS IN IMAGE READING SYSTEM

(75) Inventor: Hiroaki Yasuda, Minamiashigara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/391,596

(22) Filed: Mar. 20, 2003

(65) Prior Publication Data
US 2003/0190068 A1 Oct. 9, 2003

(30) Foreign Application Priority Data
Mar. 22, 2002 (JP) ......................................... 2002-080805

(51) Int. Cl.[7] .............................. G02B 7/04; H05G 1/38
(52) U.S. Cl. ............................ 250/201.2; 250/363.01; 378/98; 378/146; 378/62
(58) Field of Search ..................... 250/201.2, 363.01; 378/98, 146, 62

(56) References Cited

U.S. PATENT DOCUMENTS

| 4,589,034 | A | 5/1986 | Yokomizo |
| 4,817,123 | A | 3/1989 | Sones et al. |
| 4,903,205 | A | 2/1990 | Hishinuma |
| 6,542,222 | B1 * | 4/2003 | Tsuji et al. .................... 355/67 |
| 6,624,421 | B1 * | 9/2003 | Takeda ................... 250/363.01 |

FOREIGN PATENT DOCUMENTS

JP  55-12429  1/1980

* cited by examiner

Primary Examiner—John R. Lee
Assistant Examiner—Paul M. Gurzo
(74) Attorney, Agent, or Firm—Sughrue Mion, PLLC (57) ABSTRACT

Radiation image information is read from a stimulable phosphor sheet by line sensors and corrected for shading by a shading corrector. Thereafter, the radiation image information is corrected for sharpness independently in main and auxiliary directions by a sharpness corrector using spatial filters which are selected from a spatial filter memory by a spatial filter selector according to recording or reading conditions.

16 Claims, 7 Drawing Sheets

METHOD OF AND APPARATUS FOR CORRECTING IMAGE SHARPNESS IN IMAGE READING SYSTEM

BACKGROUND OF THE INVENTION

1. Field of the Invention

The present invention relates to a method of and an apparatus for correcting the sharpness of image information in an image reading system in which a sensor comprising an array of photoelectric transducers arranged in a main direction is moved with respect to a recording medium in an auxiliary direction that is substantially perpendicular to the main direction for thereby two-dimensionally reading image information recorded on the recording medium with the sensor.

2. Description of the Related Art

There is known a radiation image information recording and reading system which employs a stimulable phosphor which, when exposed to an applied radiation (X-rays, α-rays, β-rays, γ-rays, electron beams, ultraviolet radiation, or the like), stores a part of the energy of the radiation, and, when subsequently exposed to applied stimulating light such as visible light, emits light in proportion to the intensity of the stored energy of the radiation. In the radiation image information recording and reading system, the radiation image information of a subject such as a human body or the like is temporarily recorded in a stimulable phosphor sheet which comprises a stimulable phosphor layer in the form of a sheet, and then stimulating light such as a laser beam is applied to the stimulable phosphor sheet to cause the stimulable phosphor sheet to emit light representing the recorded radiation image information. The emitted light is photoelectrically read to produce an electric image signal. Based on the image signal, the radiation image information of the subject is outputted as a visible image on a recording medium such as a photographic photosensitive medium or the like or a display unit such as a CRT (Cathode Ray Tube) or the like.

One type of such a radiation image information recording and reading system is known as a point-scan system. In the point-scan system, stimulating light which is moved in a main direction and applied to a stimulable phosphor sheet which is being fed in an auxiliary direction perpendicular to the main direction, and light emitted from the stimulable phosphor sheet in response to the stimulating light is transmitted through a light converging guide to a single photoelectric transducer device such as a photomultiplier or the like, which reads radiation information recorded on the stimulable phosphor sheet in synchronism with the position where the stimulable phosphor sheet is scanned by the stimulating light. In the point-scan system, reading conditions of the optical system from the stimulable phosphor sheet to the photoelectric transducer device are essentially the same in the main direction and the auxiliary direction. Therefore, if the light is emitted from the stimulable phosphor sheet isotropically in the main and auxiliary directions, an image signal produced by photoelectrically converting the light emitted from the stimulable phosphor sheet has substantially equal spatial frequency characteristics in the main and auxiliary directions, and the sharpness of the image is also substantially the same in the main and auxiliary directions.

Another type of a radiation image information recording and reading system is known as a line-scan system. In the line-scan system, the radiation image information recorded on a stimulable phosphor sheet is read by a sensor comprising an array of photoelectric transducers in a main direction while the sensor is moving in an auxiliary direction perpendicular to the main direction. In the line-scan system, since reading conditions differ in the main and auxiliary directions, the spatial frequency characteristics of an image signal produced by photoelectrically converting the light emitted from the stimulable phosphor sheet are generally not equal in the main and auxiliary directions. The spatial frequency characteristics of the image signal in the main direction depend on the focusing capability in the main direction of a light-converging optical system for guiding the light emitted from the stimulable phosphor sheet to the line sensor, and the spacing of the photoelectric transducers of the line sensor in the main direction. The spatial frequency characteristics of the image signal in the auxiliary direction depend on the focusing capability of the light-converging optical system in the auxiliary direction and the reading spacing of the photoelectric transducers in the auxiliary direction.

If the light-converging optical system comprises a lens array of SELFOC lenses arranged in the main direction, then since the positional relationship of an image signal produced by the photoelectric transducers to the lens array in the main direction and the positional relationship of the image signal to the lens array in the auxiliary direction are different from each other, the spatial frequency of the image signal in the main direction and the spatial frequency of the image signal in the auxiliary direction are not in conformity with each other. Therefore, an image produced from the image signal has a sharpness difference between the main and auxiliary directions.

SUMMARY OF THE INVENTION

It is a general object of the present invention to provide a method of and an apparatus for correcting image sharpness in an image reading system to produce image information which has substantially the same sharpness in both main and auxiliary directions.

A major object of the present invention is to provide a method of and an apparatus for correcting image sharpness in an image reading system for reading image information from a recording medium by moving a sensor comprising an array of photoelectric transducers arranged in a main direction, in an auxiliary direction with respect to the recording medium, to equalize the image sharpness in the main direction and the image sharpness in the auxiliary direction highly accurately to each other.

Another major object of the present invention is to provide a method of and an apparatus for correcting image sharpness in an image reading system for reading image information with a line sensor comprising an array of photoelectric transducers in a main direction which is combined with a light-converging optical system comprising an array of condenser lenses arranged in the main direction.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
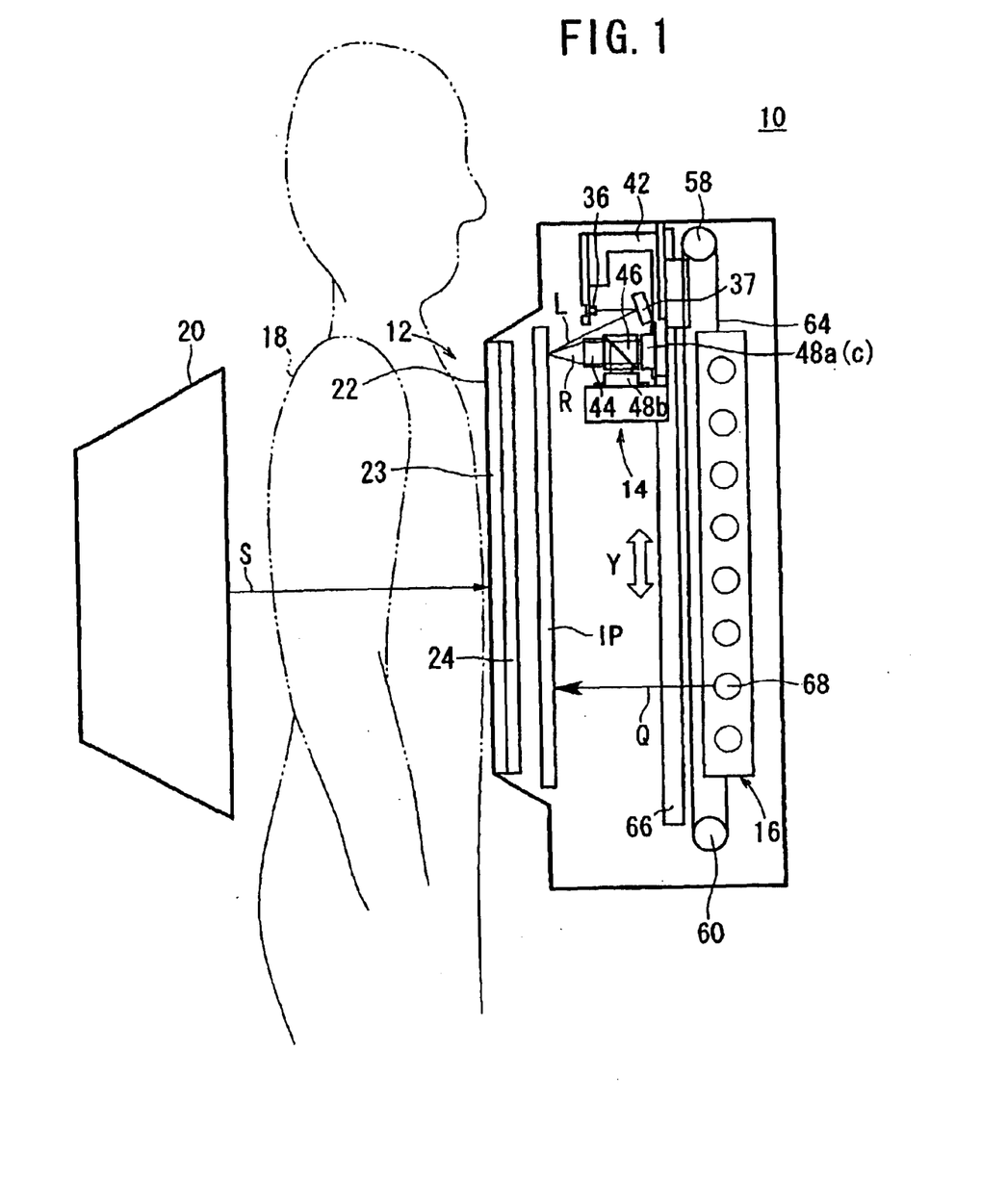
FIG. 1 is a schematic vertical cross-sectional view of a radiation image information recording and reading system to which a method of and an apparatus for correcting the sharpness of an image according to an embodiment of the present invention are applied.

FIG. 1 shows in schematic cross section a radiation image information recording and reading system 10 to which a method of and an apparatus for correcting the sharpness of an image according to an embodiment of the present invention are applied.

As shown in FIG. 1, the radiation image information recording and reading system 10 generally comprises a radiation recording unit 12 for temporarily recording the radiation image information of a subject 18 such as a human body or the like on a stimulable phosphor sheet IP, a reading unit 14 for applying stimulating light L such as a laser beam or the like to the stimulable phosphor sheet IP and photoelectrically reading light R that is emitted from the stimulable phosphor sheet IP depending on the radiation intensity of the recorded radiation image information, and an erasing light source 16 for discharging radiation energy that is left in the stimulable phosphor sheet IP.

The radiation recording unit 12 has a radiation source 20 for generating a radiation S and a radiation-permeable imaging base 22 for holding the subject 18 in position thereon. A phototimer 23 and a grid 24 for removing scattered rays are disposed behind the imaging base 22. The stimulable phosphor sheet IP is fixedly held in a given imaging position behind the grid 24.

The reading unit 14 is vertically movable along a guide rail 66 which extends vertically as indicated by the arrow Y. The reading unit 14 has a casing 42 held in movable engagement with the guide rail 66. The casing 42 is movable along the guide rail 66 in an auxiliary direction indicated by the arrow Y by a belt 64 which is connected to the casing 42 and trained around a drive pulley 58 and a driven pulley 60 that are positioned respectively at the upper and lower ends of the guide rail 66.

The reading unit 14 has a laser diode array 36 for outputting stimulating light L, disposed in an upper portion of the casing 42. The stimulating light L which is outputted in a linear beam from the laser diode array 36 is reflected by a mirror 37 fixed to the casing 42, and applied to the stimulable phosphor sheet IP in a main direction which is perpendicular to the auxiliary direction indicated by the arrow Y.

Line sensors 48a, 48b, 48c, such as CCDs, are disposed in a lower portion of the casing 42 for detecting light R which is emitted from the stimulable phosphor sheet IP in response to the stimulating light L, through a condenser lens array 44 and a prism 46, and photoelectrically converting the detected light R into an electric signal. The condenser lens array 44 may be a SELFOC lens array comprising a plurality of lenses arranged in the main direction. The prism 46 serves to divide the light R into a beam to be applied to the line sensors 48a, 48c that are mounted on a side panel of the casing 42 and a beam to be applied to the line sensor 48b that is mounted on a bottom panel of the casing 42. Each of the line sensors 48a, 48b, 48c, which are disposed in a staggered fashion, comprises an array of photoelectric transducers arranged in the main direction indicated by the arrow X. The line sensors 48a, 48b, 48c may include a sensor having a plurality of lines arranged in the auxiliary direction indicated by the arrow Y, and include an area sensor having a longitudinal axis in the main direction. The line sensors 48a, 48b, 48c may not necessarily be provided as three line sensors. The line sensors 48a, 48b, 48c are combined with filters (not shown) for passing the light R emitted from the stimulable phosphor sheet IP and blocking extraneous light including the stimulating light L.

The erasing light source 16 is positioned across the reading unit 14 from the stimulable phosphor sheet IP. The erasing light source 16 comprises a plurality of fluorescent lamps 68 for applying erasing light Q to the stimulable phosphor sheet IP to discharge radiation energy remaining in the stimulable phosphor sheet IP.

Figure 2:
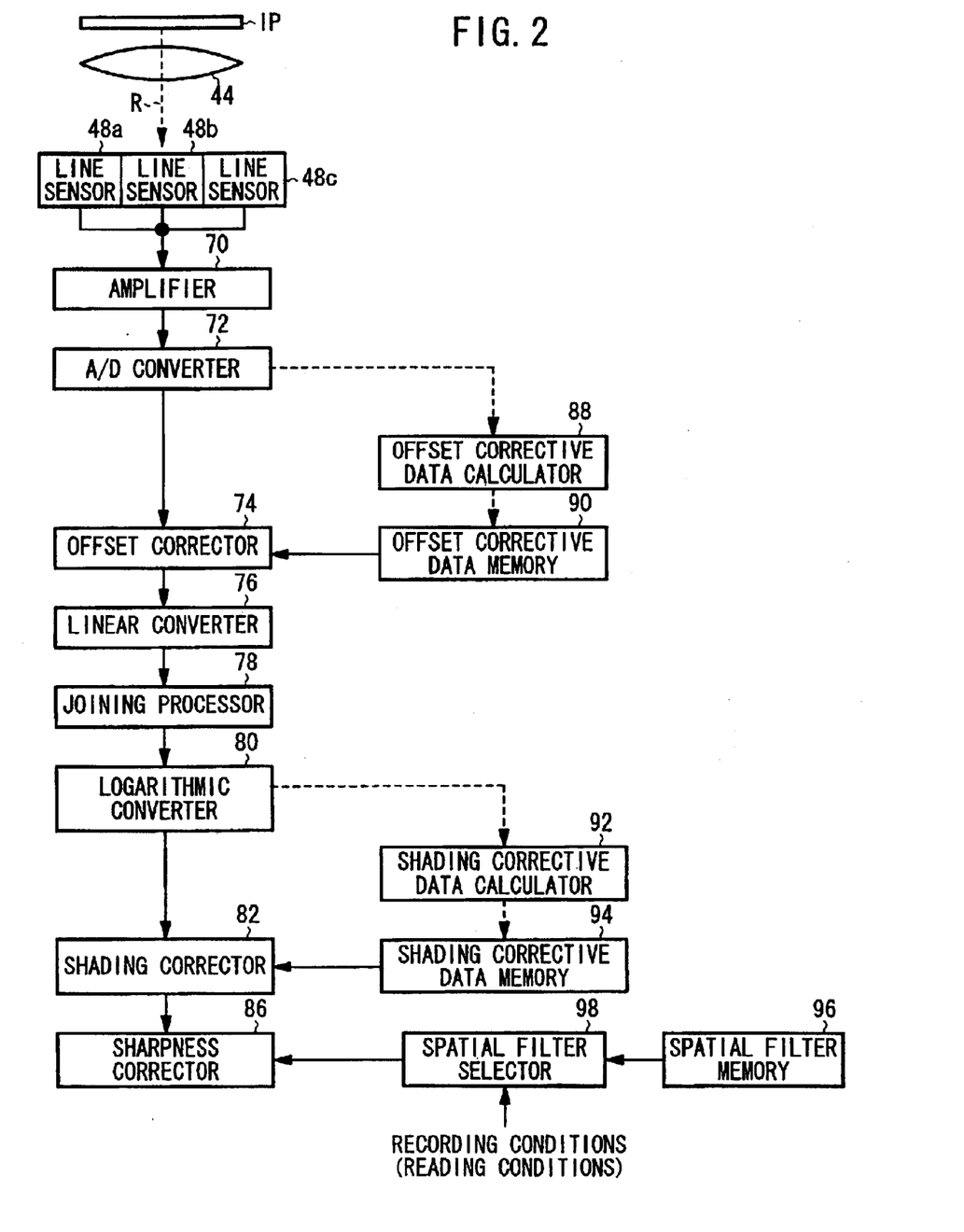
FIG. 2 is a block diagram of a processing circuit of a reading unit in the radiation image information recording and reading system.

FIG. 2 shows in block form a processing circuit of the reading unit 14 in the radiation image information recording and reading system 10.

As shown in FIG. 2, the processing circuit of the reading unit 14 comprises an amplifier 70 for amplifying an electric signal produced by the line sensors 48a through 48c, an A/D (Analog-to-Digital) converter 72 for converting the amplified electric signal into a digital image signal, an offset corrector 74 for correcting an offset of the line sensors 48a through 48c, a linear converter 76 for converting the image signal into a linear signal by correcting the nonlinearity of the electric signal produced by the line sensors 48a through 48c, a joining processor 78 for adjusting signals from joints between the line sensors 48a through 48c, a logarithmic converter 80 for converting the image signal into a logarithmic image signal, a shading corrector 82 for correcting the shading of the logarithmic image signal, and a sharpness corrector 86 for correcting the sharpness of the shading-corrected image signal in the main and auxiliary directions.

To the A/D converter 72, there is connected an offset corrective data calculator 88 for calculating offset corrective data to be supplied to the offset corrector 74. Offset corrective data calculated by the offset corrective data calculator 88 are stored in an offset corrective data memory 90. The offset corrective data are corrective data for correcting output signals (dark output signals) which are generated by the photoelectric transducers of the line sensors 48a through 48c when no light is detected by the line sensors 48a through 48c.

To the logarithmic converter 80, there is connected a shading corrective data calculator 92 for calculating shading corrective data to be supplied to the shading corrector 92. Shading corrective data calculated by the shading corrective data calculator 92 are stored in a shading corrective data memory 94. The shading corrective data are corrective data including high-frequency components for correcting characteristic variations in a one-dimensional direction (the main direction) of the laser diode array 36, the condenser lens array 44, the photoelectric transducers of the line sensors 48a through 48c arrayed in the main direction, and corrective data primarily including low-frequency components for correcting irradiation irregularities of the radiation S outputted from the radiation source 20, coating irregularities of the stimulable phosphor on the stimulable phosphor sheet IP, and irregularities of the scattered ray removal capability of the grid 24.

To the sharpness corrector 86, there is connected by a spatial filter selector 98 a spatial filter memory 96 for storing filtering coefficients making up a plurality of types of spatial filters for performing a sharpness correcting process. The spatial filters stored in the spatial filter memory 96 are selected by the spatial filter selector 98 depending on the recording conditions under which radiation image information is recorded on the stimulable phosphor sheet IP and the reading conditions under which radiation image information recorded on the stimulable phosphor sheet IP is read. The recording conditions include an imaging area which is to be imaged of the subject 18 and which is represented by the radiation image information recorded on the stimulable phosphor sheet IP, a radiation dose to be applied to the subject 18, the type of the stimulable phosphor sheet IP used for recording the radiation image information thereon, which are determined on an imaging menu which is given for the subject 18 by the radiation image information recording and reading system 10. The reading conditions include a reading rate to read the radiation image information recorded on the stimulable phosphor sheet IP, the reading rate being determined by a reading mode of the radiation image information recorded on the stimulable phosphor sheet IP.

The radiation image information recording and reading system 10 is basically constructed as described above. Operation and advantages of the radiation image information recording and reading system 10 will be described below.

First, a process of generating offset corrective data and shading corrective data in the radiation image information recording and reading system 10 will be described below with reference to FIG. 3. It is assumed that, as shown in FIG. 4, the stimulable phosphor sheet IP is divided into n pixels in the main direction indicated by the arrow X by the photoelectric transducers of the line sensors 48a through 48c, and m pixels in the auxiliary direction indicated by the arrow Y, each pixel being represented by coordinates (x, y) in an XY coordinate system having coordinate axes represented by the arrows X, Y.

While the laser diode array 36 of the reading unit 14 and the fluorescent lamps 68 of the erasing light source 16 are being de-energized, electric signals from the photoelectric transducers of the line sensors 48a through 48c are detected through the amplifier 70 and the A/D converter 72. The offset corrective data calculator 88 generates the detected electric signals as offset corrective data O(x) for the photoelectric transducers of the line sensors 48a through 48c, and stores the offset corrective data O(x) in the offset corrective data memory 90 in step S1.

Then, with the subject 18 being not placed in the radiation recording unit 12, the radiation source 20 applies the radiation S through the phototimer 23 and the grid 24 to the stimulable phosphor sheet IP uniformly over its surface. The reading unit 14 reads radiation image information from the stimulable phosphor sheet IP thus uniformly exposed to the radiation S in step S2. Specifically, The radiation image information recorded on the uniformly exposed stimulable phosphor sheet IP contains a low-frequency slightly changing component based on irradiation irregularities of the radiation S and coating irregularities of the stimulable phosphor on the stimulable phosphor sheet IP.

Stimulating light L outputted from the laser diode array 36 is reflected by the mirror 37 and applied to the stimulable phosphor sheet IP while being deflected in the main direction. In response to the stimulating light L, the stimulable phosphor sheet IP emits light R representing the radiation energy stored therein. The emitted light R is applied through the condenser lens array 44 and the prism 46 to the line sensors 48a through 48c, which convert the light R into an electric signal. The electric signal is amplified by the amplifier 70, and then converted by the A/D converter 72 into a digital signal representing corrective data acquisition image data Dorg(x,y). The corrective data acquisition image data Dorg(x,y) include a random high-frequency component produced by individual characteristic variations of the laser diode array 36, the condenser lens array 44, and the photoelectric transducers of the line sensors 48a through 48c.

The offset corrector 74 reads the offset corrective data O(x) generated in step S1 from the offset corrective data memory 90, and corrects the corrective data acquisition image data Dorg(x,y) with the offset corrective data O(x) according to the following equation:

$$Doff(x,y)=Dorg(x,y)-O(x)$$

thus generating offset-corrected image data Doff(x,y) in step S3.

The offset-corrected image data Doff(x,y) are then converted into linear data by the linear converter 76 in step S4, and then joined between the line sensors 48a through 48c by the joining processor 78 in step S5. The joined offset-corrected image data Doff(x,y) are then converted by the logarithmic converter 80 into logarithmic data D log(x,y) (=Log(Doff(x,y))) which can be added, in step S6.

The shading corrective data calculator 92 adds and averages the logarithmic offset-corrected image data D log(x,y) for each photoelectric transducer in the direction indicated by the arrow Y, and determines average offset-corrected image data Ds(x) as follows:

$$Ds(x)=1/m \cdot \Sigma D \log(x,y)$$

in step S7. In the above equation, the symbol $\Sigma$ means the addition of the offset-corrected image data D log(x,y) from the m pixels in the direction indicated by the arrow Y.

Then, the shading corrective data calculator 92 adds and averages the average offset-corrected image data Ds(x) in the direction indicated by the arrow X, and determines an average value Ds_ave as follows:

$$Ds\_ave=1/n \cdot \Sigma Ds(x)$$

in step S8. In the above equation, the symbol $\Sigma$ means the addition of the average offset-corrected image data Ds(x) from the n pixels in the direction indicated by the arrow X.

Finally, the shading corrective data calculator 92 determines one-dimensional corrective data S1(x) from the average value Ds_ave and the average offset-corrected image data Ds(x) as follows:

$$S1(x)=Ds\_ave-Ds(x)$$

in step S9. Using the one-dimensional corrective data S1(x) thus determined, it is possible to correct shading due to the random high-frequency component produced by individual characteristic variations of the laser diode array 36, the condenser lens array 44, and the photoelectric transducers of the line sensors 48a through 48c. The shading corrective data calculator 92 stores the calculated one-dimensional corrective data S1(x) in the shading corrective data memory 94.

Then, the shading corrector 82 corrects the logarithmic offset-corrected image data D log(x,y) with the one-dimensional corrective data S1(x) to determine one-dimensional corrected image data D1(x,y) as follows:

$$D1(x,y)=D\ \log(x,y)+S1(x)$$

in step S10.

Then, the shading corrector 82 performs an unsharp masking process on the one-dimensional corrected image data D1(x,y) to determine low-frequency corrected image data Dlow(x,y) in step S11. The low-frequency corrected image data Dlow(x,y) can be produced by adding and averaging a plurality of one-dimensional corrected image data D1(x,y) around one-dimensional corrected image data D1(x,y) under consideration. Specifically, if it is assumed that the number of pixels in a processing range in the direction indicated by the arrow X is j and the number of pixels in the processing range in the direction indicated by the arrow Y is k, the low-frequency corrected image data Dlow(x,y) can be determined by the following equation:

$$Dlow(x,y)=1/(j\cdot k)\cdot\Sigma\Sigma D1(x,y)$$

In the above equation, the symbol ΣΣ means the addition of one-dimensional corrected image data D1(x,y) from the j pixels in the direction indicated by the arrow X and the k pixels in the direction indicated by the arrow Y. By thus smoothing the one-dimensional corrected image data D1(x,y), it is possible to reduce the effect of noise due to a high-frequency component.

Then, the shading corrector 82 adds and averages the low-frequency corrected image data Dlow(x,y) in the directions indicated by the arrows X, Y to determine an average value Dave as follows:

$$Dave=1/(n\cdot m)\cdot\Sigma\Sigma Dlow(x,y)$$

in step S12. In the above equation, the symbol ΣΣ means the addition of low-frequency corrected image data Dlow(x,y) from the n pixels in the direction indicated by the arrow X and the m pixels in the direction indicated by the arrow Y.

Then, the shading corrector 82 determines smoothed two-dimensional corrective data S2(x,y) from the average value Dave and the low-frequency corrected image data Dlow(x,y) as follows:

$$S2(x,y)=Dave-Dlow(x,y)$$

in step S13. Using the two-dimensional corrective data S2(x,y) thus determined, it is possible to correct shading due to a low-frequency slightly changing component based on irradiation irregularities of the radiation S and coating irregularities of the stimulable phosphor on the stimulable phosphor sheet IP.

The smoothed two-dimensional corrective data S2(x,y) serve to correct irregularities based on a low-frequency component and do not contain a high-frequency component. Therefore, there is no large change between adjacent ones of the smoothed two-dimensional corrective data S2(x,y). The two-dimensional corrective data S2(x,y) are decimated to produce a smaller number of two-dimensional corrective data S2(x,y) in step S14. The reduced two-dimensional corrective data S2(x,y) are stored, together with the one-dimensional corrective data S1(x), in the shading corrective data memory 94.

Figure 5:
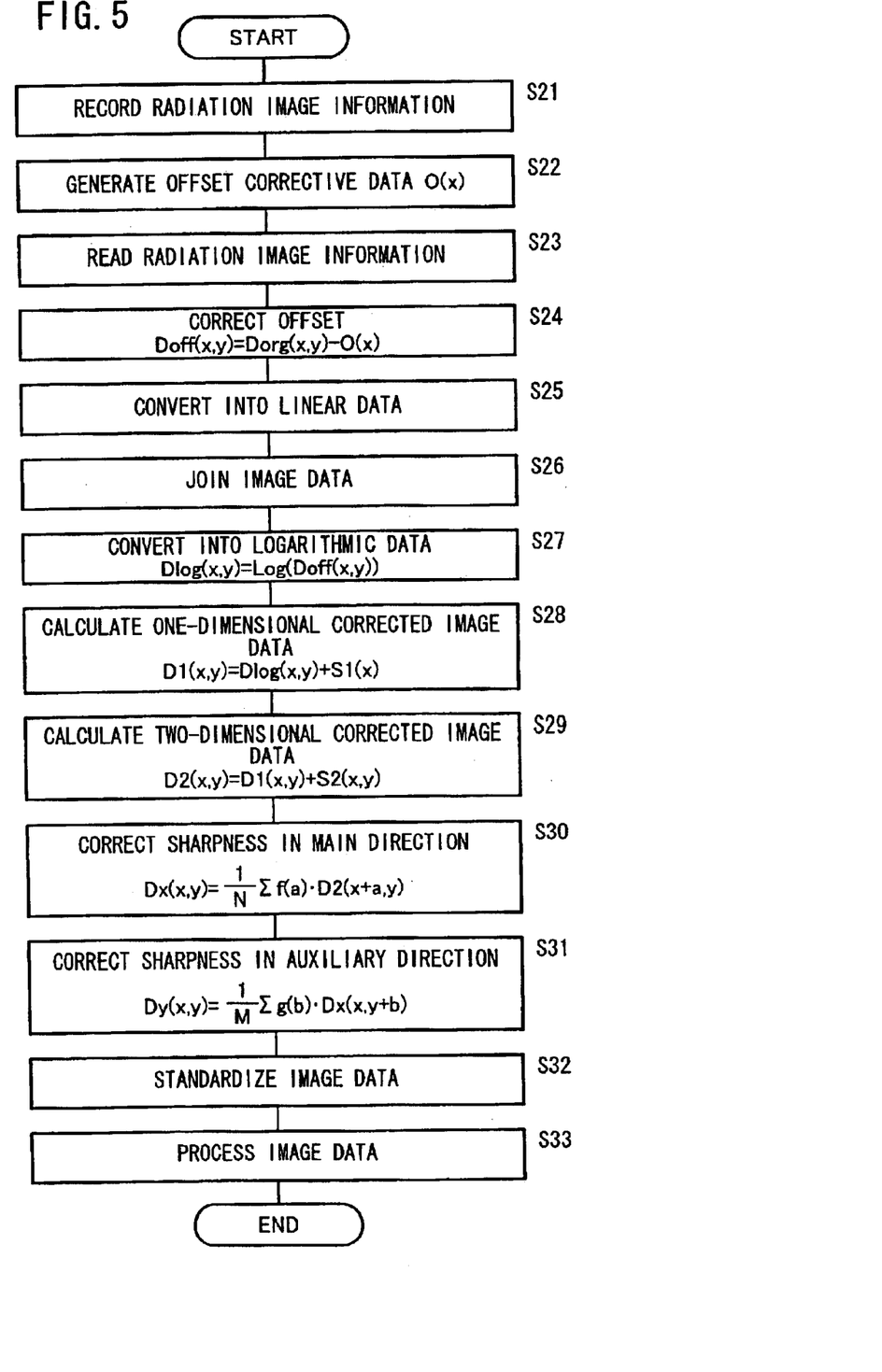
FIG. 5 is a flowchart of a process of correcting shading and a process of correcting sharpness for radiation image information.

A process of reading radiation image information from the stimulable phosphor sheet IP in the radiation image information recording and reading system 10 will be described below with reference to FIG. 5.

The operator of the radiation image information recording and reading system 10 sets an imaging area, an imaging tube voltage in the radiation source 20, a radiation dose, etc. according to a given imaging menu, positions the subject 18 in a predetermined location in the radiation recording unit 12, and energizes the radiation source 20 to apply the radiation S from the radiation source 20 to the subject 18. The radiation S that has passed through the subject 18 is transmitted through the phototimer 23 and the grid 24, and reaches the stimulable phosphor sheet IP where the radiation S records the radiation image information of the subject 18 in step S21.

Figure 3:
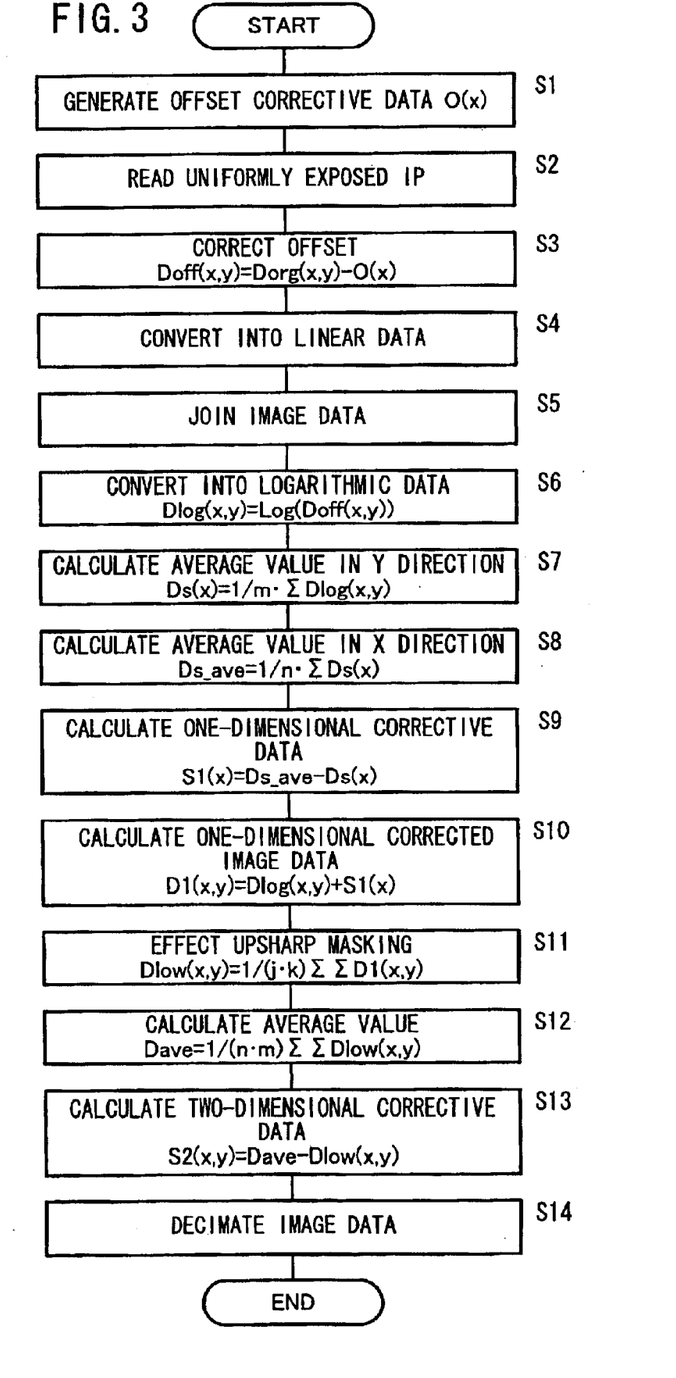
FIG. 3 is a flowchart of a process of generating corrective data in the radiation image information recording and reading system.
Figure 4:
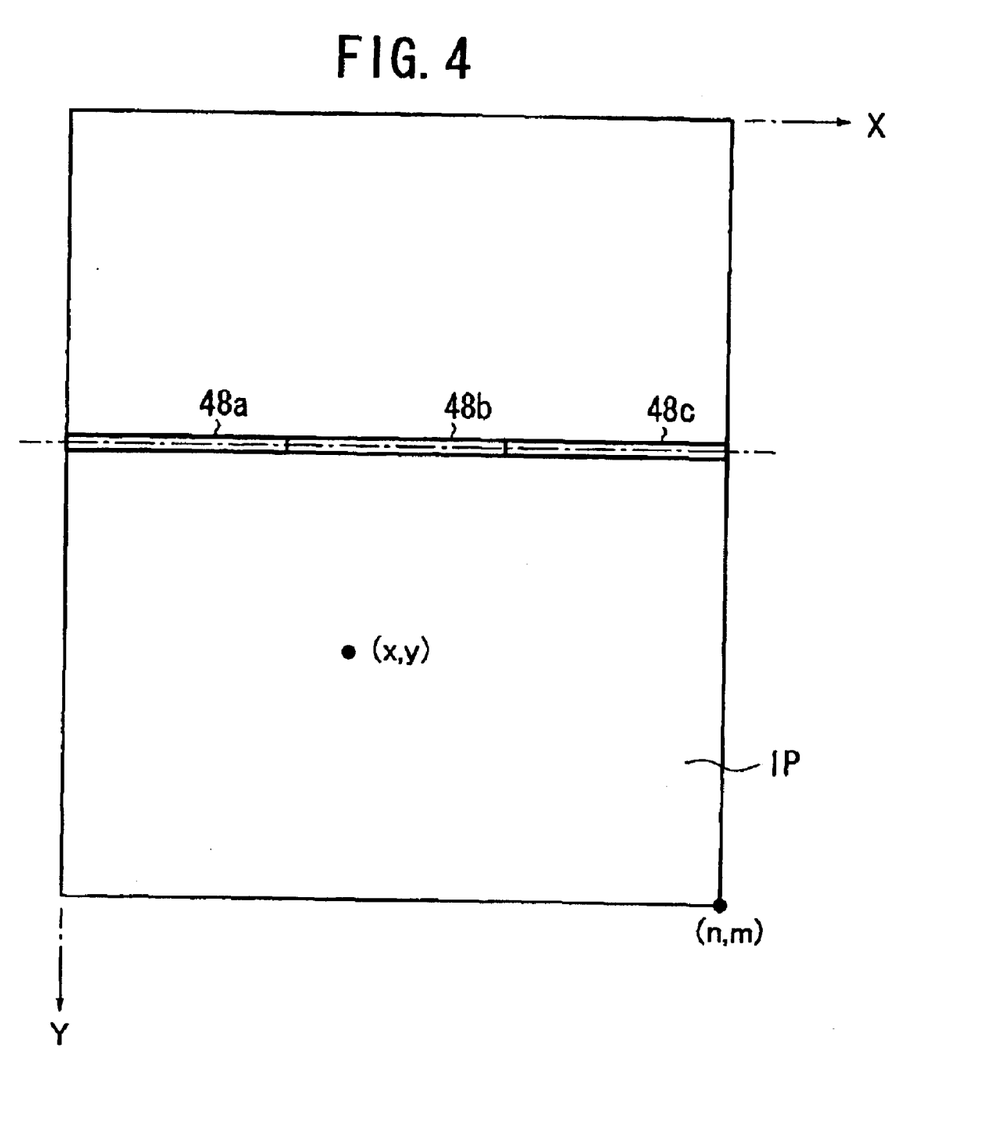
FIG. 4 is a diagram showing a coordinate system established on a stimulable phosphor sheet.

Prior to reading the recorded radiation image information from the stimulable phosphor sheet IP, offset corrective data O(x) are generated in step S22 in the same manner as with step S1 (see FIG. 3). Specifically, since the offset corrective data O(x) tend to vary depending on the temperature of the radiation image information recording and reading system 10, it is preferable to generate the offset corrective data O(x) at periodic intervals or immediately prior to reading cycles. The generated offset corrective data O(x) are stored in the offset corrective data memory 90.

Then, the operator selects a reading mode such as a high-image-quality mode at a low reading rate or a high-rate reading mode at a high reading rate. The reading unit 14 is energized in the selected reading mode to read the radiation image information recorded on the stimulable phosphor sheet IP in step S23. Image data Dorg(x,y) based on the radiation image information read from the stimulable phosphor sheet IP are corrected for an offset by the offset corrector 74 based on the offset corrective data O(x) acquired from the offset corrective data memory 90, thus generating offset-corrected image data Doff(x,y) as follows:

$$Doff(x,y)=Dorg(x,y)-O(x)$$

in step S24.

The offset-corrected image data Doff(x,y) are then converted into linear data by the linear converter 76 in step S25, and then joined between the line sensors 48a through 48c by the joining processor 78 in step S26. The joined offset-corrected image data Doff(x,y) are then converted by the logarithmic converter 80 into logarithmic offset-corrected image data D log(x,y) as follows:

$$D\ \log(x,y)=Log(Doff(x,y))$$

in step S27.

Then, the shading corrector 82 corrects the logarithmic offset-corrected image data D log(x,y) with the one-dimensional corrective data S1(x) stored in the shading corrective data memory 94 to determine one-dimensional corrected image data D1(x,y) as follows:

$$D1(x,y)=D\ \log(x,y)+S1(x)$$

in step S28.

Then, the shading corrector 82 corrects the one-dimensional corrected image data D1(x,y) with the two-dimensional corrective data S2(x,y) stored in the shading corrective data memory 94 to determine two-dimensional corrected image data D2(x,y) as follows:

$$D2(x,y)=D1(x,y)+S2(x,y)$$

in step S29. Since the shading corrective data memory 94 stores the two-dimensional corrective data S2(x,y) which have been decimated in step S14 for reducing the amount of data to be stored, the shading corrector 82 calculates two-dimensional corrected image data D2(x,y) using interpolated data of the two-dimensional corrective data S2(x,y).

The corrected data D2(x,y) are then corrected for sharpness in the main direction by the sharpness corrector 86 in step S30 and thereafter corrected for sharpness in the auxiliary direction by the sharpness corrector 86 in step S31.

The radiation dose applied to the subject 18 is adjusted by controlling the imaging tube voltage in the radiation source 20 depending on the imaging area according to the imaging menu. Even if the radiation dose applied to the subject 18 remains the same, the radiation that reaches the stimulable phosphor sheet IP differs from imaging area to imaging area. The light R emitted from the stimulable phosphor sheet IP is spread in a different pattern depending on the type of the stimulable phosphor sheet IP used. Furthermore, since the energy of the stimulating light L applied to the stimulable phosphor sheet IP differs depending on the reading mode such as the high-image-quality mode or the high-rate reading mode, the spreading pattern of the light R emitted from the stimulable phosphor sheet IP upon exposure to the stimulating light L also differs depending on the energy of the stimulating light L. The radiation image information obtained from the stimulable phosphor sheet IP has its spatial frequency characteristics depending on the radiation energy which has been stored in the stimulable phosphor sheet IP depending on the radiation dose applied thereto and the discharging characteristics of the stored radiation energy.

The spatial frequency characteristics of the radiation image information depend on the characteristics in the main and auxiliary directions of the condenser lens array 44 and the prism 46 which guide the emitted right R to the line sensors 48a through 48c and also on the spacing in the main direction of the photoelectric transducers of the line sensors 48a through 48c and the reading spacing of the photoelectric transducers in the auxiliary direction.

Consequently, the sharpness and balance in the main and auxiliary directions of the corrected image data D2(x,y) which represent the radiation image information before it is corrected for sharpness differ depending on the imaging menu, the type of the stimulable phosphor sheet IP, the reading mode, etc.

The spatial filter selector 98 selects a spatial filter corresponding to the sharpness and balance from the spatial filter memory 96 according to the recording or reading conditions including the imaging menu set by the operator, the type of the stimulable phosphor sheet IP, the reading mode, etc., and supplies the selected spatial filter to the sharpness corrector 86. The sharpness corrector 86 then performs a sharpness correcting process on the corrected image data D2(x,y) using the supplied spatial filter.

Specifically, if a filtering coefficient which provides a spatial filter for correcting the sharpness in the main direction is represented by f(a), then the corrected image data D2(x,y) are corrected to determine image data Dx(x,y) that are corrected in the main direction, as follows:

$$Dx(x,y)=1/N \cdot \Sigma f(a) \cdot D2(x+a,y)$$

in step S30. In the above equation, "a" represents an integer indicative of a pixel range used for filtering, Σ represents an addition in the pixel range a, and N=Σf(a).

Figure 6:
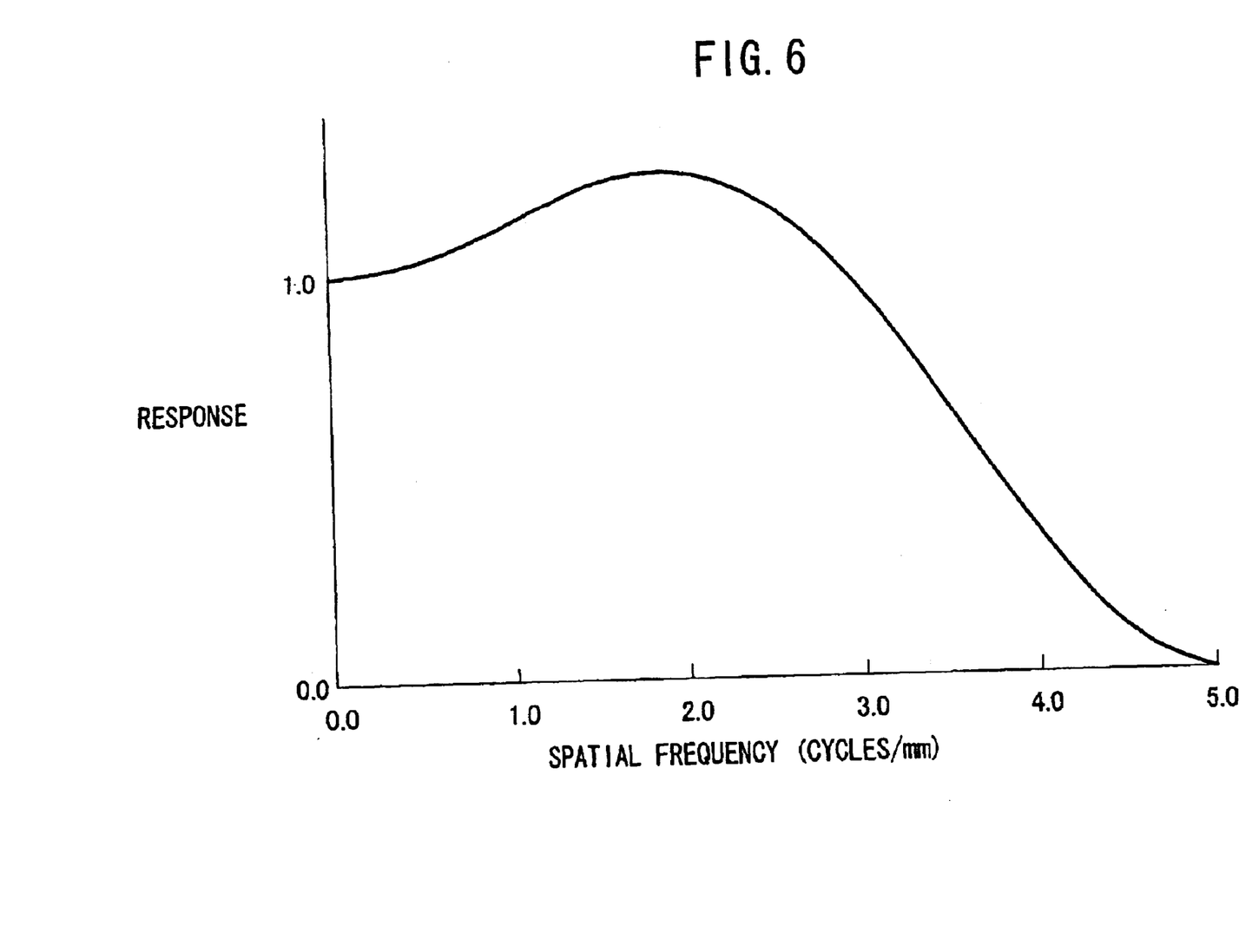
FIG. 6 is a diagram illustrative of the relationship between the spatial frequency and response of a filter for intensifying sharpness.

FIG. 6 shows the relationship between the spatial frequency (cycles/mm) and response in the main direction when the filtering coefficient f(a) is as follows:

$$f(a)=(-2\ 3\ 10\ 3\ -2)$$

If this filtering coefficient f(a) is used, then there is provided an effect to intensify in the main direction the sharpness of the corrected image data D2(x,y) before they are corrected for sharpness.

The sharpness corrector 86 then corrects the image data Dx(x,y), which have been corrected for sharpness in the main direction, using a filtering coefficient g(b) which provides a spatial filter for correcting the sharpness in the auxiliary direction, selected from the spatial filter memory 96, to determine image data Dy(x,y) that are corrected in the auxiliary direction, as follows:

$$Dy(x,y)=1/M \cdot \Sigma g(b) \cdot Dx(x,y+b)$$

in step S31. In the above equation, "b" represents an integer indicative of a pixel range used for filtering, Y represents an addition in the pixel range b, and M=Σg(b).

Figure 7:
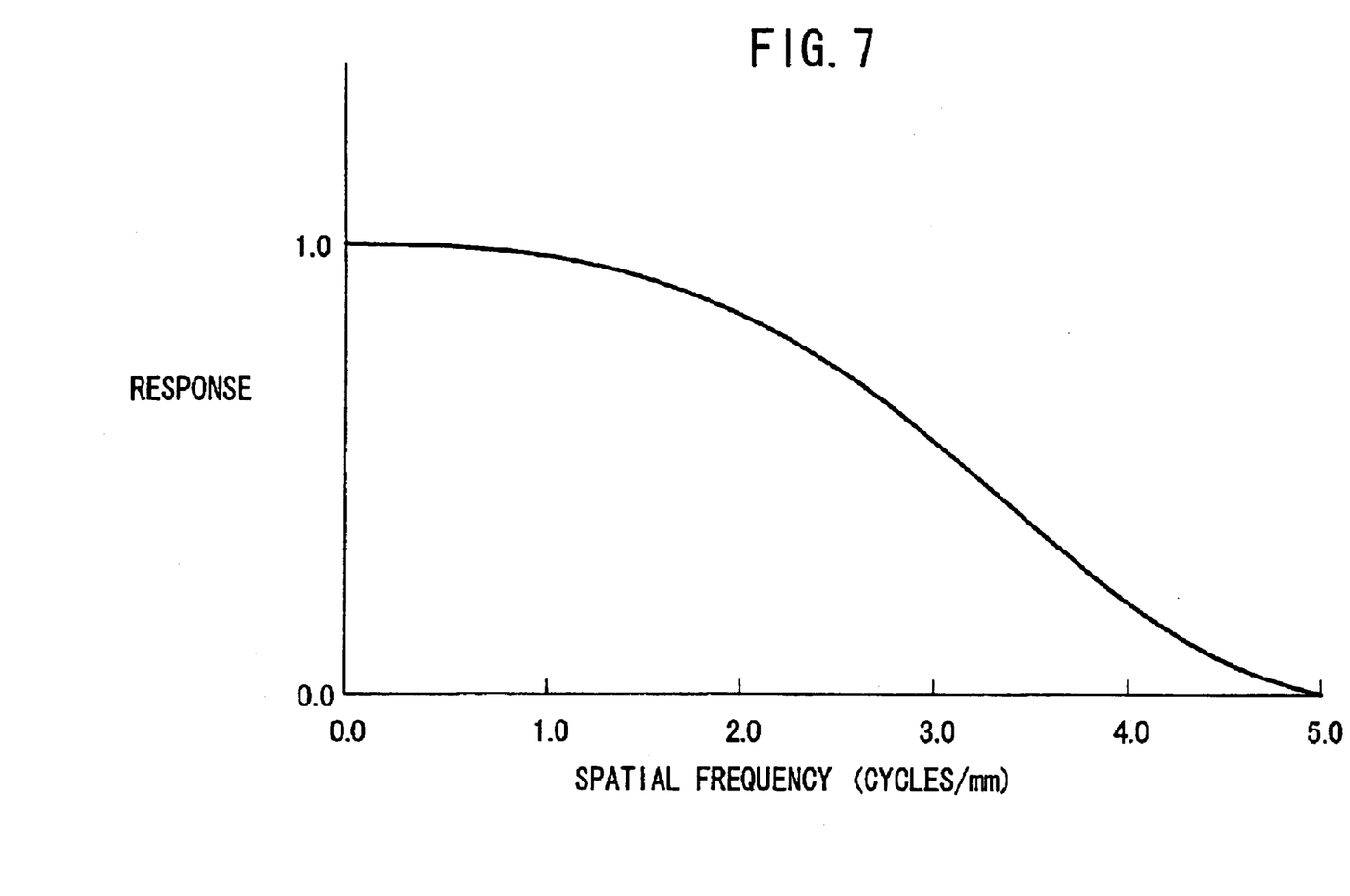
FIG. 7 is a diagram illustrative of the relationship between the spatial frequency and response of a filter for weakening sharpness.

FIG. 7 shows the relationship between the spatial frequency (cycles/mm) and response in the main direction when the filtering coefficient g(b) is as follows:

$$g(b) = \begin{pmatrix} -2 \\ 10 \\ 25 \\ 10 \\ -2 \end{pmatrix}$$

If this filtering coefficient g(b) is used, then there is provided an effect to weaken in the auxiliary direction the sharpness of the image data Dx(x,y).

By using spatial filters having appropriate filtering coefficients f(a), g(b), it is possible to obtain image data Dy(x,y) which have been corrected for sharpness substantially equally in the main and auxiliary directions.

Then, the image data Dy(x,y) are standardized in step S32, and then processed for gradation correction, color correction, etc. in step S33. The image data can be processed as desired without taking into consideration the difference between the sharpness in the main direction and the sharpness in the auxiliary direction. The radiation image information thus processed is then supplied to an external diagnostic apparatus or the like. The image processing in step S33 may be carried out by an external image processing apparatus rather than the radiation image information recording and reading system 10.

When the process of reading the radiation image information from the stimulable phosphor sheet IP is finished, the erasing light source 16 is energized to apply erasing light Q from the fluorescent lamps 68 to the entire surface of the stimulable phosphor sheet IP, thereby removing residual radiation energy therefrom. Then, the stimulable phosphor sheet IP will be used to record next radiation image information.

In the above embodiment, a one-dimensional filtering process is carried out to intensity the sharpness of image data in the main direction, and a one-dimensional filtering process is carried out to weaken the sharpness of the image data in the auxiliary direction. However, the sharpness of image data in either the main direction or the auxiliary direction may be fixed as reference sharpness, and the sharpness of the image data in the other direction may be adjusted to match the reference sharpness.

Furthermore, a filtering coefficient fg(a,b) which is the inner product of the filtering coefficient f(a) in the main direction and the filtering coefficient g(b) in the auxiliary direction may be determined as follows:

$$fg(a,b) = (-2 \ 3 \ 10 \ 3 \ -2) \begin{pmatrix} -2 \\ 10 \\ 25 \\ 10 \\ -2 \end{pmatrix}$$

$$= \begin{pmatrix} 4 & -6 & -20 & -6 & 4 \\ -20 & 30 & 100 & 30 & -20 \\ -50 & 75 & 250 & 75 & -50 \\ -20 & 30 & 100 & 30 & -20 \\ 4 & -6 & -20 & -6 & 4 \end{pmatrix}$$

Using the filtering coefficient fg(a,b), image data D(x,y) may then be subjected to a two-dimensional filtering process as follows:

$$D(x,y) = 1/P \cdot \Sigma\Sigma fg(a,b) \cdot D2(x+a, y+b)$$

thus simultaneously correcting the sharpness in the main direction and the sharpness in the auxiliary direction. In the above equation, the symbol $\Sigma\Sigma$ means the addition of image data in the pixel ranges a, b of the filtering processes in the main and auxiliary directions, and $P = \Sigma\Sigma fg(a,b)$.

In the radiation image information recording and reading system 10 according to the above embodiment, the line sensors 48a through 48c are moved in the auxiliary direction with respect to the stimulable phosphor sheet IP to read the radiation image information therefrom. However, the principles of the present invention are also applicable to a radiation image information recording and reading system in which the line sensors 48a through 48c are movable in the auxiliary direction with respect to the line sensors 48a through 48c which are fixed in position.

Although a certain preferred embodiment of the present invention has been shown and described in detail, it should be understood that various changes and modifications may be made therein without departing from the scope of the appended claims.

What is claimed is:

1. A method of correcting the sharpness of image information in an image reading system for moving a line sensor having an array of photoelectric transducers arranged in a main direction, in an auxiliary direction substantially perpendicular to the main direction with respect to a recording medium and two-dimensionally reading image information recorded on the recording medium with the photoelectric transducers, said method comprising the step of:

correcting the sharpness of the image information read in said main direction and the sharpness of the image information read in said auxiliary direction such that the sharpness of the image information read in said main direction and the sharpness of the image information read in said auxiliary direction are substantially the same as each other.

2. A method according to claim 1, wherein said step of correcting the sharpness of the read image information comprises the step of effecting one-dimensional filtering using spatial filters which are set respectively in said main direction and said auxiliary direction.

3. A method according to claim 2, wherein said spatial filters are selected according to a recording condition to record the image information on said recording medium and/or a reading condition to read the image information from said recording medium.

4. A method according to claim 3, wherein said recording condition comprises a type of said recording medium.

5. A method according to claim 3, wherein said recording condition comprises an imaging area represented by the image information recorded on said recording medium.

6. A method according to claim 3, wherein said recording condition comprises a radiation dose to be applied to record the image information on said recording medium.

7. A method according to claim 3, wherein said reading condition comprises a reading rate to read the image information recorded on said recording medium.

8. A method according to claim 1, wherein said step of correcting the sharpness of the read image information comprises the step of effecting two-dimensional filtering using a spatial filter which is set in said main direction and said auxiliary direction.

9. A method according to claim 8, wherein said spatial filter is selected according to a recording condition to record the image information on said recording medium and/or a reading condition to read the image information from said recording medium.

10. A method according to claim 9, wherein said recording condition comprises a type of said recording medium.

11. A method according to claim 9, wherein said recording condition comprises an imaging area represented by the image information recorded on said recording medium.

12. A method according to claim 9, wherein said recording condition comprises a radiation dose to be applied to record the image information on said recording medium.

13. A method according to claim 9, wherein said reading condition comprises a reading rate to read the image information recorded on said recording medium.

14. An apparatus for correcting the sharpness of image information in an image reading system for moving a line sensor having an array of photoelectric transducers arranged in a main direction, in an auxiliary direction substantially perpendicular to the main direction with respect to a recording medium and two-dimensionally reading image information recorded on the recording medium with the photoelectric transducers, said apparatus comprising:

a spatial filter memory for storing a spatial filter for correcting the sharpness of the image information read in said main direction and the sharpness of the image information read in said auxiliary direction such that the sharpness of the image information read in said main direction and the sharpness of the image information read in said auxiliary direction are substantially the same as each other:

a spatial filter selector for selecting said spatial filter from said spatial filter memory according to a recording condition to record the image information on said recording medium and/or a reading condition to read the image information from said recording medium; and a sharpness corrector for correcting the sharpness of said image information with the selected spatial filter.

15. An apparatus according to claim 14, further comprising:

a light-converging optical system disposed between said recording medium and said line sensor, said light-converging optical system comprising an array of condenser lenses arranged in said main direction.

16. An apparatus according to claim 14, further comprising:

an offset corrector for correcting an offset of the photoelectric transducers of said line sensor; and a shading corrector for correcting shading of the image information which has been corrected for the offset;

said sharpness corrector comprising means for correcting the sharpness of said image information which has been corrected for the offset and shading.

* * * * *